Oct. 13, 1936.  R. J. KEHL ET AL  2,057,150

TWO-STAGE PRESSURE REGULATOR

Filed March 21, 1932  2 Sheets-Sheet 1

INVENTORS:
Robert J. Kehl,
Homer W. Jones,
BY
ATTORNEYS.

Oct. 13, 1936.    R. J. KEHL ET AL    2,057,150
TWO-STAGE PRESSURE REGULATOR
Filed March 21, 1932    2 Sheets-Sheet 2

INVENTORS:
Robert J. Kehl,
Homer W. Jones,
BY Byrnes, Townsend & Potter
ATTORNEYS.

Patented Oct. 13, 1936

2,057,150

UNITED STATES PATENT OFFICE 2,057,150

TWO-STAGE PRESSURE REGULATOR

Robert J. Kehl, Bayside, and Homer W. Jones, Williamsville, N. Y., assignors, by mesne assignments, to Union Carbide and Carbon Corporation, a corporation of New York Application March 21, 1932, Serial No. 600,313

20 Claims. (Cl. 50—23)

This invention relates to a pressure regulating and reducing valve and more particularly to improvements in regulators of the type wherein the pressure of a highly compressed gas is reduced in two stages to a comparatively low working pressure for cutting, welding and other purposes.

The valve seats heretofore used in both stages of a multi-stage regulator have been made of relatively hard material, since the pressure of the gas admitted to the regulator from a container of compressed gas such as oxygen at about 2000 lbs. per square inch pressure, requires that the material of the seat in the first stage shall not be inflammable at the temperatures developed by the sudden compression of the residual gas in the inlet passages leading to the first stage valve when high pressure gas is admitted to this stage. However, when used in the second stage, a seat of hard material provides poor regulating characteristics and is inefficient in preventing leakage. Hence, one of the objects of this invention is to improve the second stage valve seat and its associated assembly to overcome the above and other objections. To this end, the second stage valve seat has been made of softer material, such as soft rubber. However, a soft rubber seat is deformed in service more easily than a seat of harder material and it is therefore necessary to provide means whereby the seat may be compressed sufficiently tight to prevent leakage but not compressed to a degree that will alter the regulating characteristics and capacity of the regulator.

Inasmuch as the use of a soft rubber seat in the first stage of the regulator would be hazardous, it is also an object of the present invention to so construct the two valve assemblies that the second stage valve assembly may not be interchanged with the first stage assembly. Another object of the invention is to so construct the second stage valve that it will cooperate more effectively with its seat and will not embed itself too deeply therein. Still another object is to more accurately centralize and distribute the pressure of the spring-adjusting screw that varies the pressure on the second stage diaphragm and determines the pressure of the gas delivered by the regulator.

The above and other objects and the novel features of the invention will be apparent from the following description taken with the drawings, in which, Fig. 1 is a sectional view of an improved two stage regulator embodying the present invention;

Figure 1:
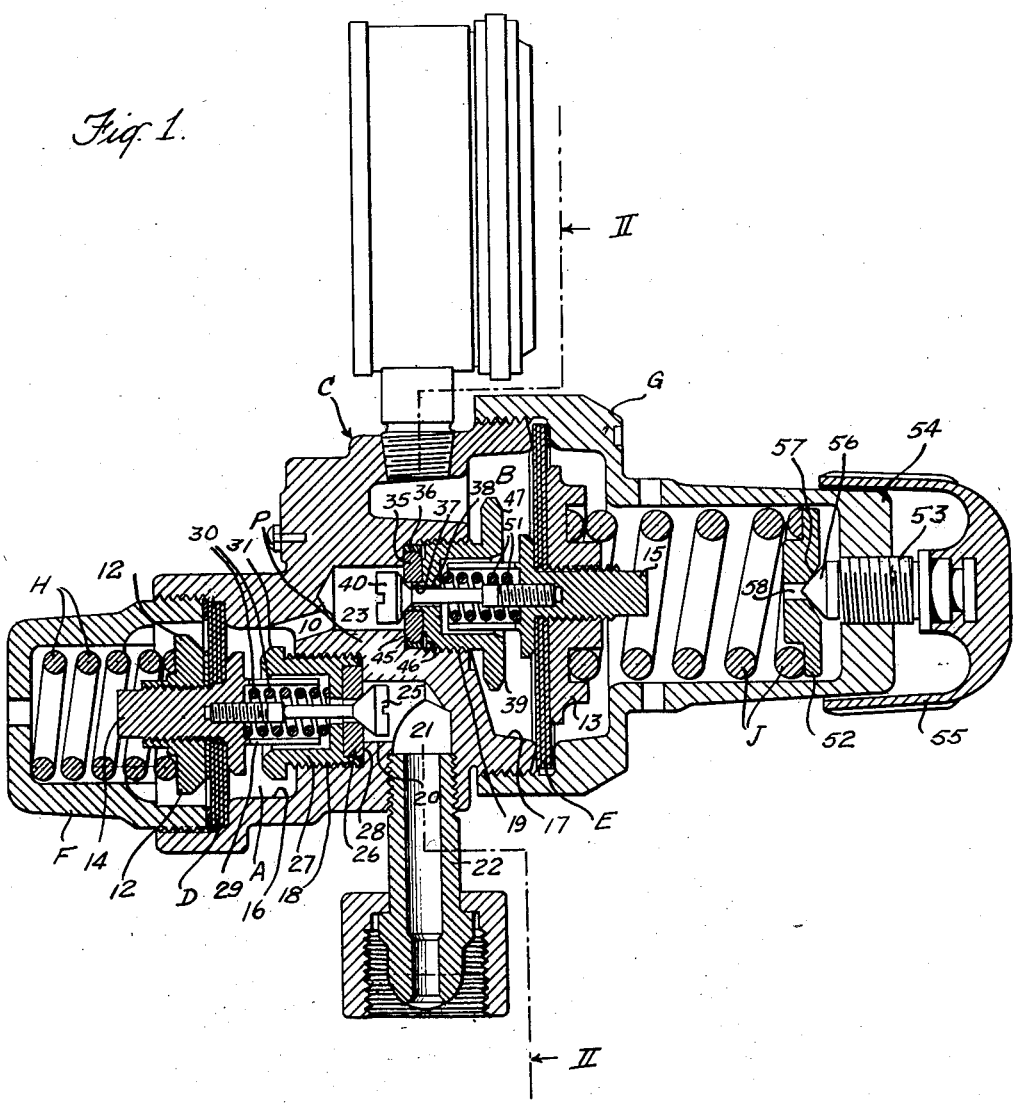
Figure 2:
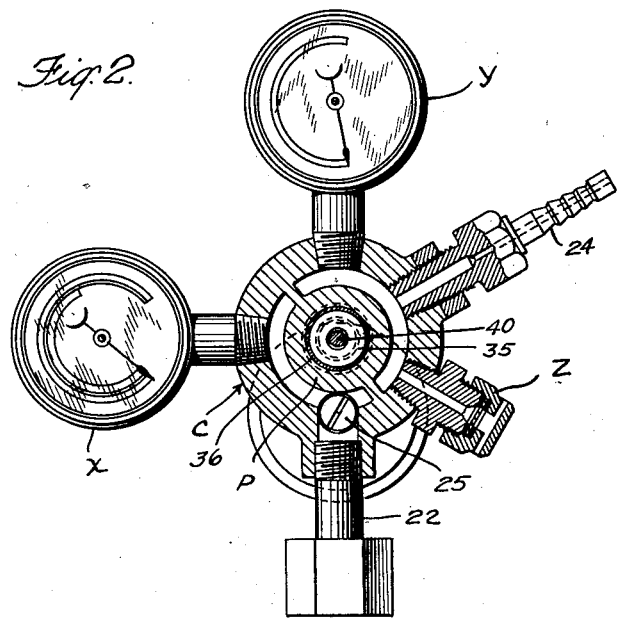
Fig. 2 is a sectional view of the same on the line II—II of Fig. 1.

As shown in the drawings, the casing C of the improved regulator may consist of a brass casting formed to provide a high-pressure valve chamber A and a low-pressure valve chamber B, which chambers are connected by a passage 10 drilled through a partition P near the center of the casing. Pressure-responsive diaphragms D and E, providing covers and end walls for the chambers A and B respectively, are held in place by threaded caps F and G respectively, which caps serve as housings for the springs H and J. These springs press against internally threaded plates 12 and 13 clamped against the outer sides of the diaphragms by threaded studs 14 and 15, the heads of which are clamped tightly against the inner faces of the diaphragms.

Each of the valve chambers A and B consists of three parts, progressively of smaller size from the diaphragms inward. The largest part 16 of the chamber A is of considerably smaller size than the largest part 17 of the chamber B, but the other two parts of each of the two chambers are of the same diameter, the intermediate parts or bores 18 and 19 of the two chambers desirably having the same diameter, threading and depth, which features reduce the manufacturing cost of drilling and machining the two valve chambers. The smallest part 20 of the chamber A communicates with an inlet passage 21 connected to a nipple 22 that is adapted to be coupled to a container of compressed gas, such as a cylinder which contains oxygen at about 2000 lbs. pressure. The largest part 16 of the chamber A communicates through the passage 10 with the smallest part 23 of the chamber B, and the largest part 17 of the chamber B communicates with an outlet nipple 24 to which a delivery pipe may be coupled to supply low pressure gas to appliances such as blowpipes.

The first stage of pressure reduction is affected by the valve 25 in the chamber A, and is at a practically fixed ratio because of the non-adjustability of the spring H and its constant pressure against the diaphragm D to which the stem of the valve 25 is connected. The head of the valve 25 moves in the smallest part 20 of the chamber A and its conical or tapering face cooperates with an annular seat 26 and controls the flow of gas through the central port in said seat. The seat 26 should be of relatively hard and rigid material such as horn, which will resist ignition due to the sudden compression of the residual gas in the inlet 21 by the sudden admission of high pressure gas from the cylinder connected to the nipple 22.

A clamping bushing or cup 27 is threaded into the intermediate chamber part 18 and has a recess in the bottom thereof to receive and hold the seat 26 in place against a shoulder 28 between the small and intermediate chamber parts 20 and 18. The bottom of the cup 27 has a central port which registers with the central port in the seat 26, and the stem of the valve 25 extends through these registering ports and through the clamping cup and is secured in a threaded recess in the diaphragm stud 14. A circular row of spaced fingers 29 on the head of the stud 14 extend into the cup 27 to form a cage which encloses a spring 30 that is compressed between the bottom of the cup 27 and the head of stud 14 and tends to hold the valve head against the seat 26. In order to secure the valve assembly (including the cup, the valve, its seat and the diaphragm stud as a unit) in place, the outer end of the cup has an out-turned polygonal flange 31 disposed in the chamber part 16 and adapted to fit a socket wrench whereby the cup may be turned and screwed into or out of the intermediate chamber part.

Figure 3:
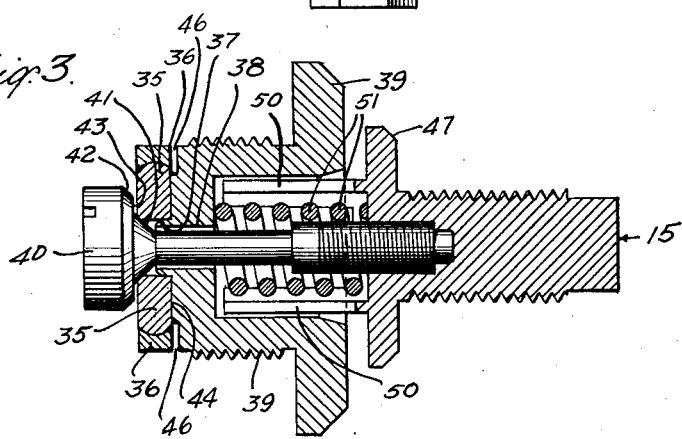
Fig. 3 is an enlarged sectional view of the second stage valve and assembly.

The valve assembly in the chamber B is similar, in general, to the one in the chamber A, and the unitary arrangement with the diaphragm stud is best shown in Fig. 3. According to the present invention there are certain important differences which better adapt the assembly for chamber B to perform its particular function. Since the valve seat 35 of this assembly is not subject to such high gas pressure and the possibility of ignition as is the seat 26, it may be made of softer material such as soft rubber, and will thereby more satisfactorily perform its function. However, to insure that the seat 35 shall retain its shape, a metal ring 36 of brass or the like is closely fitted to the periphery of the seat or the rubber seat is molded in the ring, thereby preventing spreading of the seat in use; and to centralize the seat and prevent deformation and reduction in the size of its port, an annular nipple 37, coextensive with the port 38 in and integral with the bottom of the threaded clamping cup 39, extends into the central port in the seat 35 but not so far as to interfere with the proper seating of the tapering face of the valve 40 against the other end of the port in the seat.

Figure 4:
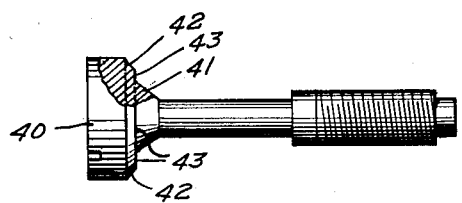
Fig. 4 is a view of the second stage valve.

A valve head similar to that of the valve 25 in chamber A would embed itself too deeply in a soft rubber seat under some service conditions and result in poor regulation. To overcome this objection in the second stage, the seating face of the valve 40 consists of two conical surfaces 41 and 42 and an intermediate step or annular flat surface 43, as best shown in Fig. 4. The smaller conical surface 41 ordinarily effects the sealing but when, due to a greater closing force on the valve or to long use and wear, the step 43 engages the seat 35, a much greater area of sealing contact is provided and the valve head is prevented from embedding itself too deeply in the seat. The larger conical surface 42 also assists in preventing poor regulating characteristics because, although the soft rubber seat may flow a short distance onto the periphery of this surface and produce a certain amount of permanent deformation of the seat after a considerable period of use, such deformation will be conical and the similar surface 42 cooperating therewith will require only a short lift to open the valve to allow a normal flow of gas.

If, on the other hand, the valve head were provided with a single conical seating surface similar to that of valve 25, the over-flowing portion of the soft seat would in time extend past the corner at the juncture of the conical and cylindrical portions of the valve head, and the valve would then need to be lifted a greater distance to clear the permanently over-flowed cylindrical portion of the seat in order to permit normal flow of gas through the valve. It will be understood that the elasticity of the soft rubber seat 35 enables it to conform readily to the shape of the seating portions of the valve 40, causing a satisfactory seal when a moderate normal pressure is applied to the valve. When particles of foreign matter such as dirt, chips or scale become entrapped between the valve and the seat, the latter forms itself around such particles and the valve 40 still makes good sealing contact with its seat. The particles eventually work out of the way without cutting or damaging the seat.

The bottom of the clamping cup 39 has a raised portion or boss 44 between the central nipple 37 and the periphery of the cup 39, so that the seat 35 may be tightly pressed against the shoulder 45 by the cup and sufficient clearance will be provided at 46 to prevent engagement of the reinforcing ring 36 by the bottom of the cup when the seat is tightly clamped in place.

Since, for economy in manufacturing, the clamping cup 39 is of the same diameter and threading as the clamping cup 27 in the chamber A, suitable means must be provided to prevent accidental interchangement of the two valve assemblies. This is accomplished by providing, on the clamping cup 39, an out-turned polygonal wrench head 47 which is greater in size or outside diameter than the inside diameter of the large part 16 of the chamber A and therefore cannot be inserted in the latter.

Referring to Figs. 1 and 3, the head of the diaphragm clamping stud 15 has integral fingers 50 which project into the clamping cup 39 and provide a cage for the helical spring 51 which surrounds the valve stem that is threaded into a recess in the stud 15. The spring 51 is compressed between the stud head and the bottom of the clamping cup or bushing 39 and tends to seat the valve 40. The spring J, which opposes the pressure of the spring 51 and the gas pressure in the chamber part 17, fits in a recess in the clamping plate 13 and bears against this plate and against a pressure plate 52 which is adjustable to vary the delivery pressure of the gas. This adjustment of the plate 52 may be effected by a screw 53 which fits a threaded central hole in the thickened end wall 54 of the cap or spring housing G, and the screw 53 may be turned by a ribbed cup-shaped handle 55 secured to the outer end of the screw and overlapping the end of the housing G to exclude dust from the screw threads. To centralize the plate 52 and apply the screw pressure uniformly to the spring J, the inner conical end 56 of the screw projects into a less acutely tapered conical recess 57 in the plate 52, and the tip of the conical end 56 projects into a hole 58 which extends from the apex of the recess 57 centrally through the plate, the conical surface of the end 56 engaging the edge of the hole 58 at the bottom of the recess 57.

Suitable gages X and Y may communicate with the high pressure inlet passage 21 and the low pressure chamber B to indicate the pressure of the admitted and delivered gas, and a suitable safety device Z may be provided to protect the regulator against damage by excessive pressure.

When the regulator is not in operation, the diaphragm springs H and J unseat the valves 25 and 40, the extent to which the diaphragms are flexed and the valves are opened being limited by the engagement of the cages 29 and 50 against the bottoms of the clamping cups in which they are located. The cages 29 and 50 may frictionally fit the insides of the cup-shaped clamping bushings to centralize the thrusts of the diaphragms and to produce a slight drag which prevents chattering. Gas, when admitted, will flow past the valves and as soon as a predetermined pressure (up to about 50 lbs., depending upon the adjustment of the handle 55) is built up in the chamber part 17, the valve 40 closes. Similarly, when a pressure of about 100 lbs. is built up in the intermediate pressure chamber (comprising the chamber parts 16 and 23 and passage 10) the valve 25 closes. The spring H which determines the ratio of pressure reduction in the first stage may be changed for one of different strength to provide a smaller or greater pressure reduction in this stage.

While a preferred embodiment of the improved regulator is disclosed in detail, it will be apparent that various changes may be made therein without departing from the spirit of the invention or sacrificing its advantages.

We claim:

1. A multi-stage pressure regulator comprising a casing having a chamber for the first stage of pressure reduction and a chamber for the last stage of pressure reduction adapted to receive gas from said first stage; a valve and a valve seat for controlling the flow of gas to said first stage, said valve and valve seat being composed of relatively hard, non-inflammable material; valve members including a valve and a valve seat for controlling the flow of gas to said last stage, one of said last stage valve members being composed of relatively soft resilient material adapted to provide a resilient sealing area between said valve and valve seat.

2. In a two-stage pressure regulator the combination of a casing having a chamber for the first stage of pressure reduction and a chamber for the second stage of pressure reduction; an inlet passage to said first stage chamber; a passage adapted to connect said first and second stage chambers; said passages having portions bored and tapped to the same size; valve bushings screwed into said tapped bores; means on one of said bushings having a greater diameter than one of the said bores; a valve seat of relatively soft resilient material secured in the passage extending between the said chambers by the last-named bushing; and a valve seat of relatively hard material secured in the inlet passage to said first-stage chamber by the other of said bushings.

3. A two-stage pressure regulator comprising in a unitary casing, a high-pressure valve assembly and a low-pressure valve assembly, each assembly including a valve and a valve seat, one of the members of the high-pressure valve assembly being formed of a relatively hard non-inflammable material, one of the members of the other of said assemblies being made of a resilient compressible material, means disposed within the casing for effecting relative movement of the valve and valve seat of the respective assemblies, and means including spaced conical sealing surfaces on the valve associated with the low-pressure assembly, whereby the said member of resilient material may be compressed sufficiently tightly between the casing and the other member of that assembly to prevent leakage of fluid being regulated while maintaining the regulating characteristics and capacity of the regulator.

4. A fluid pressure regulator, comprising a compact unitary housing, laterally-offset parallel diaphragms forming the opposite walls thereof, a partition between the diaphragms forming with the latter and the housing an intermediate-pressure chamber and a low-pressure chamber, a passage connecting the said chambers, separate resilient means acting upon the outer sides of said diaphragms to press the same toward each other, means associated with the said resilient means for regulating the pressure exerted thereby on the diaphragms, valves within the housing and associated with the said diaphragms in the intermediate pressure chamber and the low pressure chamber respectively, valve seats having ports respectively cooperating with the said valves, the seat associated with the intermediate pressure chamber being of relatively hard, non-inflammable material, the seat associated with the low-pressure chamber being of soft resilient material mounted in an enclosing and reinforcing member, and a pressure-transmitting member having a central aperture, the last-named member being spaced from the enclosing member and having a portion thereof adapted to engage the seat along its lateral surface at the said port, and having a second portion thereof spaced from the said enclosing member and adapted to press the seat toward the valve, thus preventing lateral distortion of the seat while under pressure, and resilient means respectively mounted within the intermediate pressure chamber and the low pressure chamber and adapted respectively for seating the valves associated with the said chambers.

5. A fluid pressure regulator, comprising a compact unitary housing, laterally-offset parallel diaphragms forming the opposite walls thereof, a partition between the diaphragms forming with the latter and the housing an intermediate-pressure chamber and a low-pressure chamber, a passage connecting the said chambers, separate resilient means acting upon the outer sides of said diaphragms to press the same toward each other, means associated with the said resilient means for regulating the pressure exerted thereby on the diaphragms, valves within the housing and associated with the said diaphragms, valve seats having ports respectively cooperating with the said valves, the seat associated with the intermediate pressure chamber being of relatively hard, non-inflammable material, the seat associated with the low-pressure chamber being of soft resilient material mounted in an enclosing and reinforcing member, and the valve associated with the last-named seat having two conical surfaces and an intermediate annular surface providing a step between the said conical surfaces, the respective surfaces being adapted successively to engage the said seat and to form successive seals during normal operation of the valve, and resilient means respectively mounted within the intermediate pressure chamber and the low pressure chamber and adapted respectively for seating the valves associated with the said chambers.

6. In a two-stage pressure regulator, the combination of two valve assemblies, each having a clamping bushing, such bushings being of the same diameter and similarly threaded; a casing having two bores of the same diameter and threading and severally adapted to receive the proper one of said bushings and the assemblies with which they are associated; and means whereby such bushings are non-interchangeable in said bores.

7. In a two-stage fluid pressure regulator, the combination of a casing having two communicating chambers constituting a first stage and a larger second stage valve chamber respectively, such chambers having corresponding threaded bores communicating therewith which are of the same diameter and have the same threading; and a valve assembly in each of said bores to control the fluid flow therethrough, said assemblies comprising bushings of a diameter and threading to fit both of said bores, and said bushings having wrench heads of unequal size, the larger wrench head being too large to fit into the smaller of said stage chambers, whereby said assemblies are non-interchangeable in the first and second stage valve chambers.

8. In a valve mechanism, the combination of a soft rubber seat having a port, and a valve cooperating with said seat to control said port, said valve having two conical surfaces and an annular surface providing a step between said conical surfaces, one of said conical surfaces being smaller than the other and adapted to project into said port, said step being adapted to engage the opposed face of said seat around said port, and the larger conical surface being adapted to seat against a deformed portion of the seat.

9. A valve assembly comprising an externally threaded cup-shaped bushing having an axial bore; an annular boss and a short annular nipple at one end of the bushing; a stud having a portion adapted to extend within the said bushing for free longitudinal movement with respect thereto; a valve member having a bevelled sealing face, and having a stem secured to the said stud and extending through the said bore for free longitudinal movement; resilient means operatively interposed between the said bushing and the stud; a valve seat of resilient deformable material having a central bore and interposed between the said sealing face of the valve and the said boss and having a thickness greater than the length of said nipple; and seat-encircling means confining and reinforcing the outer periphery of the said seat; the last-named means being disposed at all times out of contact with the said boss.

10. A valve assembly comprising an externally threaded cup-shaped bushing having an axial bore; an annular boss and a short annular nipple at one end of the bushing; a stud having a portion adapted to extend within the said bushing for free longitudinal movement with respect thereto; a valve member having a bevelled and stepped sealing face, and having a stem secured to the said stud and extending through the said bore for free longitudinal movement; resilient means operatively interposed between the said bushing and the stud; a valve seat of resilient deformable material having a central bore and interposed between the said sealing face of the valve and the said boss and having a thickness greater than the length of said nipple; and seat-encircling means confining and reinforcing the outer periphery of the said seat; the last-named means being disposed at all times out of contact with the said boss.

11. In a valve mechanism, the combination of a valve and a seat, one of said members being composed of soft resilient material and adapted to be compressed by the other of said members; one of said members having spaced sealing bands separated by an annular substantially flat surface, said bands being adapted to successively contact with the other member to form successive ring seals during the normal operation of the valve, and means preventing lateral spreading movement of the said material when contacted by the said bands.

12. In a valve mechanism the combination of a resilient rubber valve seat and a relatively hard valve cooperating with said seat; said valve having spaced conical bands separated by an annular flat surface, said conical bands being adapted to compress said rubber seat and contact successively with said seat to form ring seals, and means preventing lateral spreading movement of the seat when compressed by the said bands.

13. In a valve mechanism, the combination of a casing having a passage therethrough, a seat of compressible resilient material positioned across said passage and having a port therethrough; a valve engaging the said seat and controlling said port; a reinforcement for the periphery of said seat; and means spaced from said reinforcement and adapted to engage the margin of said seat at the said port and to press an annular portion of said seat against a wall of said passage.

14. A valve mechanism according to claim 13, wherein said seat is of soft rubber; said reinforcement is a metal ring; and such engaging means has a boss adapted to engage the rubber seat and has a clearance whereby said ring will not be engaged by said means when the seat is pressed in place.

15. The combination of a casing having a passage therethrough; a shoulder in said passage; a seat of soft rubber on said shoulder having a central port therethrough; a valve cooperating with said seat to control said port; a metal ring engaging and reinforcing the periphery of said seat; and a bushing having a port registering with the port of said seat, said bushing also having a boss adapted to press an annular portion of said seat against said shoulder and a clearance on its face opposed to said ring, whereby the latter will not be engaged when the seat is compressed to hold it fluid-tight against said shoulder.

16. In a valve mechanism, the combination of a seat of compressible resilient material having a central port therethrough; a metal ring closely fitting the periphery of said seat; a clamping bushing having a port provided with a lip projecting part way into one end of the port in said seat, said bushing having both a clamping surface engaging an annular part of said seat and a recessed part opposite said ring; and a valve cooperating with the other end of the port in said seat.

17. In a valve mechanism, the combination of a casing having a passage therethrough; a seat of resilient compressible material positioned transversely of said passage and having a port therethrough and having a laterally unconfined portion adjacent the said port; a valve cooperating with said seat to control said port; means for centering the seat; means for reinforcing the periphery of the seat against transverse deformation; and means spaced from the last-named means for pressing an annular portion of said seat within its periphery against a wall of the said casing forming said passage.

18. In a valve mechanism, the combination of a casing having a passage therethrough, a seat of compressible resilient material positioned across said passage and having walls of resilient material forming a port therethrough; a valve supported wholly within the casing and cooperating with said seat to control said port; peripheral reinforcing means associated with the said seat; and means for centering the said seat within the said passage, the last-named means comprising a pressure-transmitting member having a portion thereof engaging said seat but spaced from said reinforcing means.

19. In a valve mechanism, the combination of a casing having a passage therethrough, a seat of compressible resilient material positioned across said passage and having a port therethrough, a valve cooperating with said seat to control said port; an independent enclosing member for the said seat, means spaced from the enclosing member for directing a regulatable pressure upon the said seat while limiting lateral distortion of the latter and reduction of the surface area of the port; and means for moving the valve toward and away from the said seat.

20. In a valve mechanism, the combination of a casing, an annular valve seat of compressible resilient material having a portion of its inner annular surface laterally unconfined, a port therethrough having walls formed of the said material; seat-encircling means confining and reinforcing the entire outer periphery of said seat; means spaced from the last-named means and adapted to prevent a reduction of the area of said port; and a valve supported wholly within the casing and cooperating with said seat.

ROBERT J. KEHL.
HOMER W. JONES.